US 6,651,127 B2

(12) United States Patent
Larson (10) Patent No.: US 6,651,127 B2
(45) Date of Patent: *Nov. 18, 2003

(54) METHOD OF DETECTING TERMINATION OF A BUS TRANSFER OPERATION

(75) Inventor: Douglas A. Larson, Lakeville, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/177,623

(22) Filed: Jun. 24, 2002

(65) Prior Publication Data

US 2002/0178393 A1 Nov. 28, 2002

Related U.S. Application Data

(63) Continuation of application No. 09/324,397, filed on Jun. 3, 1999, now Pat. No. 6,418,502.

(51) Int. Cl.[7] .............................................. G06F 13/00
(52) U.S. Cl. ...................................................... 710/306
(58) Field of Search .................................. 713/400, 500, 713/502; 710/305, 306, 107, 311, 313

(56) References Cited

U.S. PATENT DOCUMENTS

| | | | | |
|---|---|---|---|---|
| 5,905,509 A | * | 5/1999 | Jones et al. | 711/122 |
| 6,047,334 A | * | 4/2000 | Langendorf et al. | 710/5 |
| 6,418,502 B1 | * | 7/2002 | Larson | 710/306 |

FOREIGN PATENT DOCUMENTS

| | | | | |
|---|---|---|---|---|
| JP | 57-83836 A | * | 5/1982 | G06F/3/00 |
| JP | 1-236341 A | * | 9/1989 | G06F/13/28 |

* cited by examiner

*Primary Examiner*—Glenn A. Auve
(74) *Attorney, Agent, or Firm*—Trop, Pruner & Hu, P.C.

(57) ABSTRACT

A method to detect when a bus master device terminates a bus data transfer operation includes providing a first counter clocked by a first clock signal and providing a second counter clocked by a second clock signal. Outputs of the first and second counters are compared, and it is determined if termination of the bus transfer operation has occurred based on comparing the outputs.

14 Claims, 7 Drawing Sheets

FIG. 7

METHOD OF DETECTING TERMINATION OF A BUS TRANSFER OPERATION

CROSS REFERENCE TO RELATED APPLICATION

This is a continuation of U.S. Ser. No. 09/324,397, filed Jun. 3, 1999, now U.S. Pat. No. 6,418,502.

BACKGROUND

The invention relates generally to computer system data transfer operations and, more particularly, to the detection of a data transfer termination action.

Graphics capable computer systems may be characterized by their ability to rapidly generate and manipulate graphical images. In general, graphical rendering performance improves with increased memory availability (i.e., quantity) and bandwidth (i.e., access speed). As three dimensional rendering hardware and software become more pervasive, the need for larger faster memories will likely accelerate. One approach to meeting the memory requirements of graphical processing computer systems is through the use of a special purpose memory interface. For example, the Accelerated Graphics Port (AGP) specification from Intel Corporation defines a component level interface to facilitate the use of computer system memory during graphical processing operations. (See the "Accelerated Graphics Port Interface Specification," Revision 2.0, 1998).

One feature of the AGP interface is that it provides three data transfer rates: 1×, 2×, and 4×. In the 1× transfer mode, a master device may transfer data transfer requests to a target device at a clocking frequency of 66 MHz—corresponding to the operational speed of a standard 66 MHz PCI-type bus. (See the "PCI Local Bus Specification," Revision 2.2, 1999; available from the PCI Special Interest Group). In the 2× transfer mode, master to target data requests are transferred at a clocking frequency of 133 MHz, and in the 4× transfer mode, data requests transfer operations occur at a clocking frequency of 266 MHz. 2× and 4× transfer modes are realized through the use of "sideband" signals. For example, the sideband address (SBA) bus and associated sideband strobe signals may be used to enqueue AGP commands from an AGP master to an AGP target. In a typical implementation, an AGP master is a plug-in card and an AGP target is integrated within the processor-to-PCI bus bridge circuit.

Figure 1:
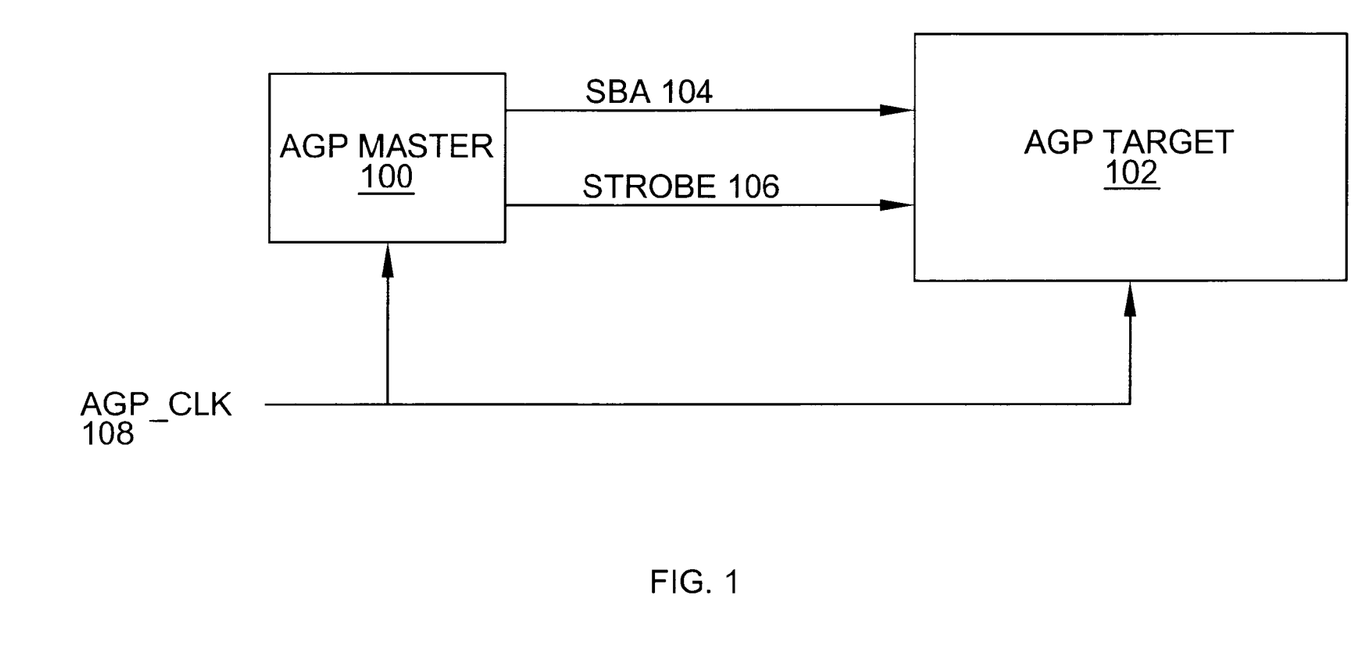
FIG. 1 shows a graphics interface block diagram in accordance with the Accelerated Graphics Port (AGP) specification.

Referring to FIG. 1, in accordance with the current AGP specification, AGP master 100 may transfer data requests to AGP target 102 via SBA bus 104 under control of master driven strobe signals 106. In addition, the AGP specification defines AGP clock signal 108 as the fundamental control clock for an AGP interface. AGP clock 108 is used to transfer data requests on SBA bus 104 in the 1× mode. When in either the 2× or 4× transfer modes, SBA bus 104 operates at two different data rates in a time multiplexed fashion: 66 MHz and 133 MHz in the 2× mode; 66 MHz and 266 MHz in the 4× mode. The low-speed (66 MHz) rate is used by AGP master 100 to initiate a synchronization event by driving SBA bus 104 with a 0× FE value. Two AGP clock cycles later, master 100 begins strobing data (via strobe signal 106) into AGP target 102 at one of the high-speed rates, 133 MHz or 266 MHz. Thereafter, AGP master 100 may continuously transfer data (i.e., data requests) to AGP target 102. Prior to terminating its transfer operation, AGP master 100 is required to drive SBA bus 104 with a NOP pattern for a minimum of four AGP clock cycles. (While a master is required to transmit at least four NOPs prior to terminating a transfer operation, such an action does not guarantee termination—master 100 may resume transferring data even after it transmits the required NOPs). If AGP master 100 does terminate its data transfer operation, it is required to drive strobe signal 106 to a specified state (high, for example) for a minimum of eight AGP clock cycles. Only then may master 100 initiate another synchronization event.

At least two factors complicate the ability of AGP target 102 to determine when a SBA bus data transfer operation has been terminated by master 100. First, AGP master 100 may resume transferring data even after transmitting four or more NOPs. Thus, target 102 may not use the presence of the required NOPs to detect the end of a data transfer operation. Second, the state of SBA port signals (e.g., SBA bus 104 and strobe signal 106) are undefined relative to AGP clock 108 during SBA bus data transfer operations. Thus, the AGP clock may not be used by target 102 to directly sample the state of strobe signal 106 to detect the end of a data transfer operation. Without the ability to reliably detect when a SBA bus data transfer operation has stopped, target device 102 may not detect subsequent synchronization events. Missed synchronization events may, in turn, cause a general malfunction of the AGP interface.

Thus, it would be beneficial to provide a technique to detect when an AGP master device has terminated a SBA bus data transfer operation.

SUMMARY

In one embodiment, the invention provides a circuit to detect when an accelerated graphics port master device terminates a sideband bus data transfer operation. The circuit includes a first register to cyclically generate a predetermined sequence of output signals at a rate determined by a first clock signal, a second register to cyclically generate the predetermined sequence of output signals at a rate determined by a second clock signal (each output signal of the second register having a corresponding first register output signal), and a detector to detect a mismatch between an output signal from the second register and a corresponding output signal from the first register. In other embodiments, the invention provides a bridge circuit and a computer system incorporating a circuit as described above.

DETAILED DESCRIPTION

Techniques (including methods and devices) to detect a data transfer termination action between devices operating in different clocking domains are described. The following embodiments of the invention, described in terms of data transfer operations between Accelerated Graphics Port (AGP) master and target devices over a sideband address (SBA) bus, are illustrative only and are not to be considered limiting in any respect.

Figure 2:
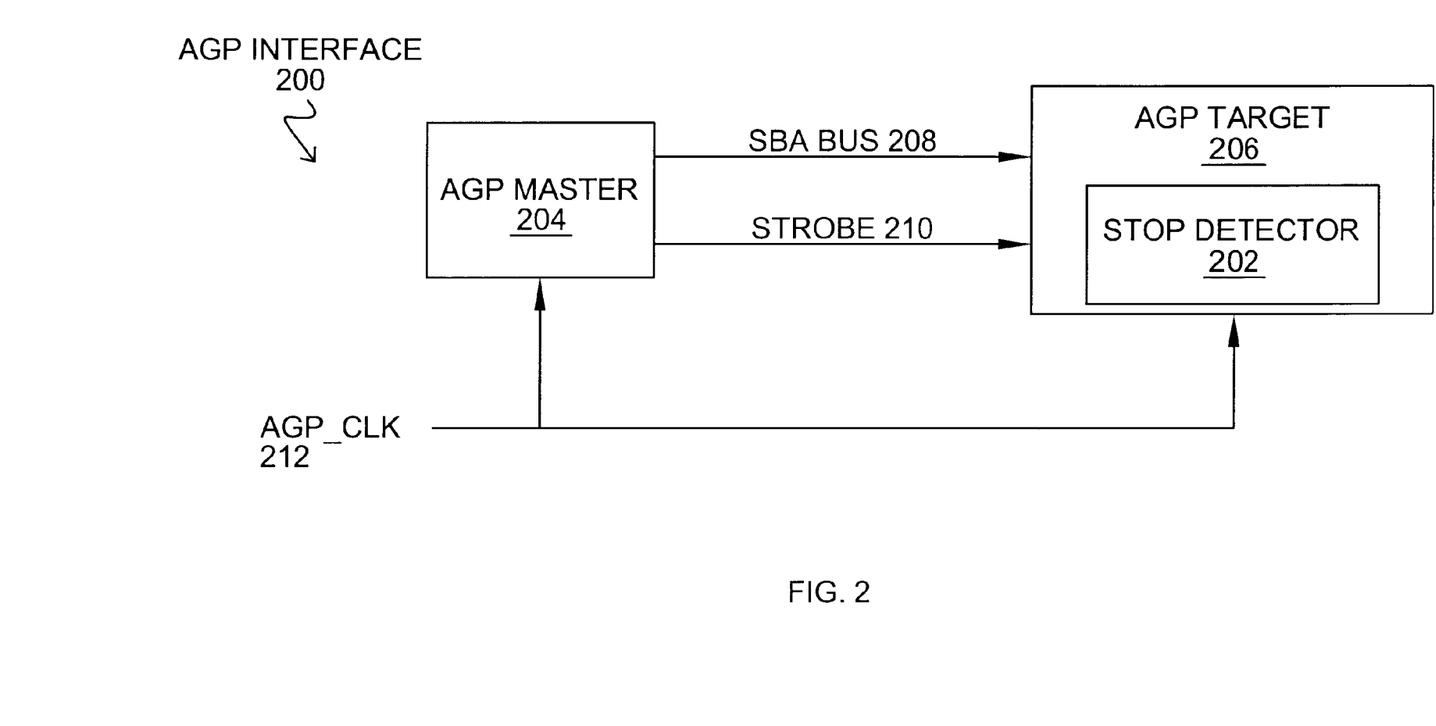
FIG. 2 shows an AGP interface in accordance with one embodiment of the invention.

Referring to FIG. 2, AGP interface 200 incorporating SBA data transfer stop detector 202 in accordance with one embodiment of the invention is shown. Interface 200 includes AGP master 204 coupled to AGP target 206 via SBA bus 208, sideband strobe signals 210 (e.g., SB_STB and its complement SB_STB#), and AGP clock signal AGP_CLK 212. In general, stop detector 202 uses a cyclical counter in the AGP clock domain (triggered by detection of an AGP synchronization event—initiated by master 204) and a complementary cyclical counter in the SBA strobe domain (driven by strobe signal/clock 210) to detect a master terminated data transfer action. (Two counters may be said to be complementary if they generate the same sequence of output signals). By selectively comparing corresponding output signals from the two complementary counters it is possible for target 206 to detect, reliably and without artifacts introduced by the asynchronous relationship between AGP clock 212 and strobe signal 210, the termination of a SBA data transfer operation.

Figure 3:
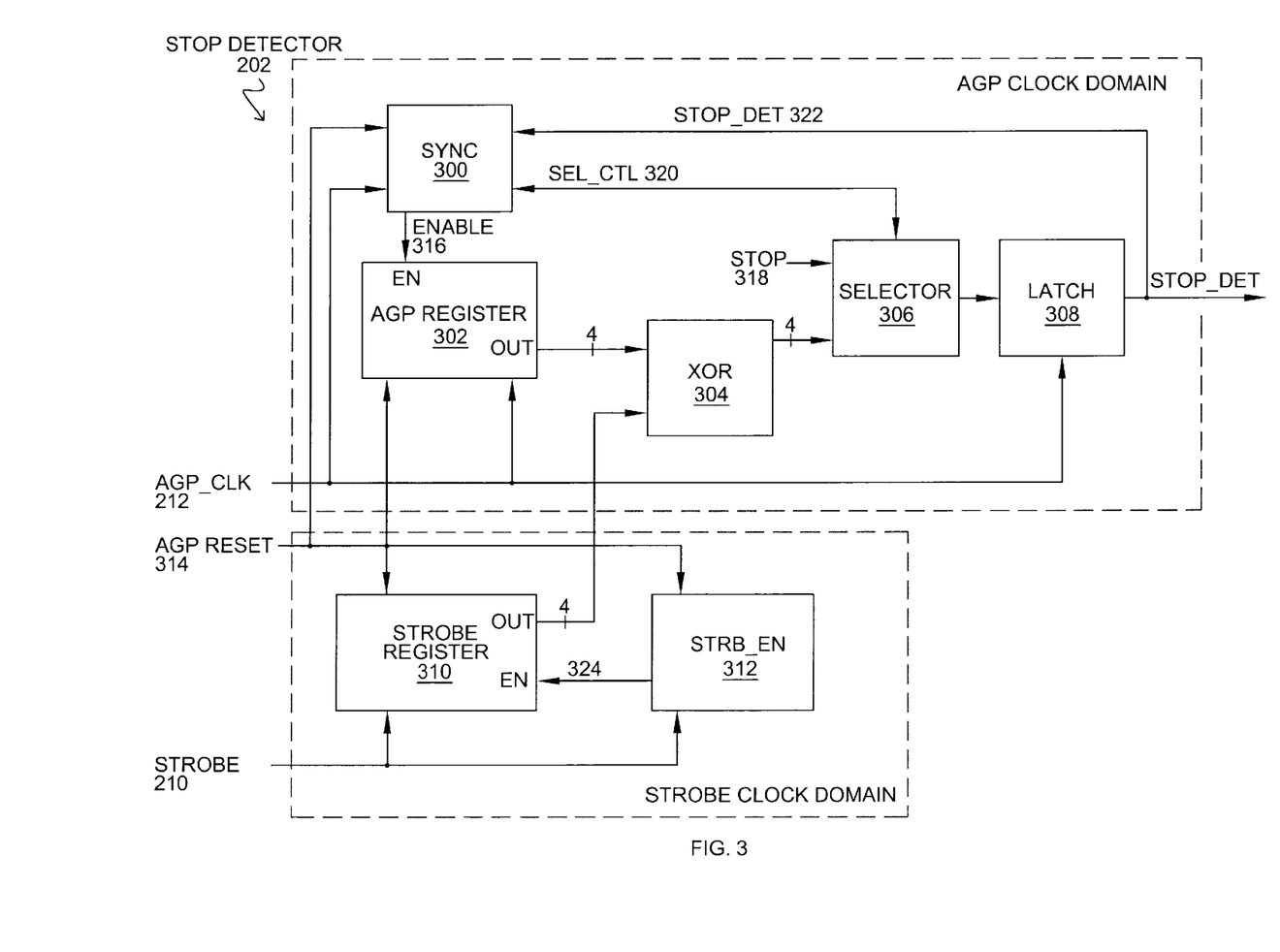
FIG. 3 shows the block diagram of a stop detector designed to operate in an AGP interface capable of transferring sideband address (SBA) bus data at 2× and 4× rates.

FIG. 3 shows a block diagram for a SBA data transfer termination detection circuit (e.g. stop detector 202) designed to operate in an AGP interface capable of transferring SBA data at 2× and 4× rates. (One of ordinary skill will recognize that strobe signal 210 is not utilized during when operating exclusively in 1× mode). Although the invention is not so limited, the current AGP specification defines the 1× rate to be 66 MHz, the 2× rate to be 133 MHz, and the 3× rate to be 266 MHz. As shown, stop detector 202 includes synchronization event detection (SYNC) circuit 300, AGP register 302, exclusive-or (XOR) comparator circuit 304, selector circuit 306, output latch 308, strobe register 310, and strobe register enable (STRB_EN) circuit 312. As indicated, SYNC circuit 300, AGP register 302, comparator 304, selector 306, and latch 308 operate in the AGP clock domain, while strobe register 310 and STRB_EN circuit 312 operate in the strobe clock domain.

Following a reset operation (i.e., assertion of AGP reset signal 314), SYNC circuit 300 disables AGP register 302 (via enable signal 316) and causes selector circuit 306 to route stop signal 318 to latch 308 in accordance with selection control (SEL_CTL) signals 320. The value of stop signal 320 is chosen to indicate "a no SBA data transfer operation" condition. On synchronization event detection (defined in the current AGP specification as SBA bus 208 being driven to a value of 0x FE while strobe signal 210 is stopped), SYNC circuit 300 enables AGP register 302 via enable signal 316 (allowing it to count or sequence its output signals as discussed below). In addition, the SYNC circuit's SEL_CTL signals 320 cause selector 306 to cyclically route each of comparator circuit 304's output signals to latch 308. In the embodiment shown in FIG. 3, for example, comparator circuit 304 has four output signals so that SEL_CTL signals 320 would cause selector 306 to route a first comparator output signal to latch 308 in a first AGP clock period, a second comparator output signal to latch 308 in a second AGP clock period, a third comparator output signal to latch 308 in a third AGP clock period, a fourth comparator output signal to latch 308 in a fourth AGP clock period, the first comparator output signal to latch 308 in a fifth AGP clock period, and so on.

Figure 4:
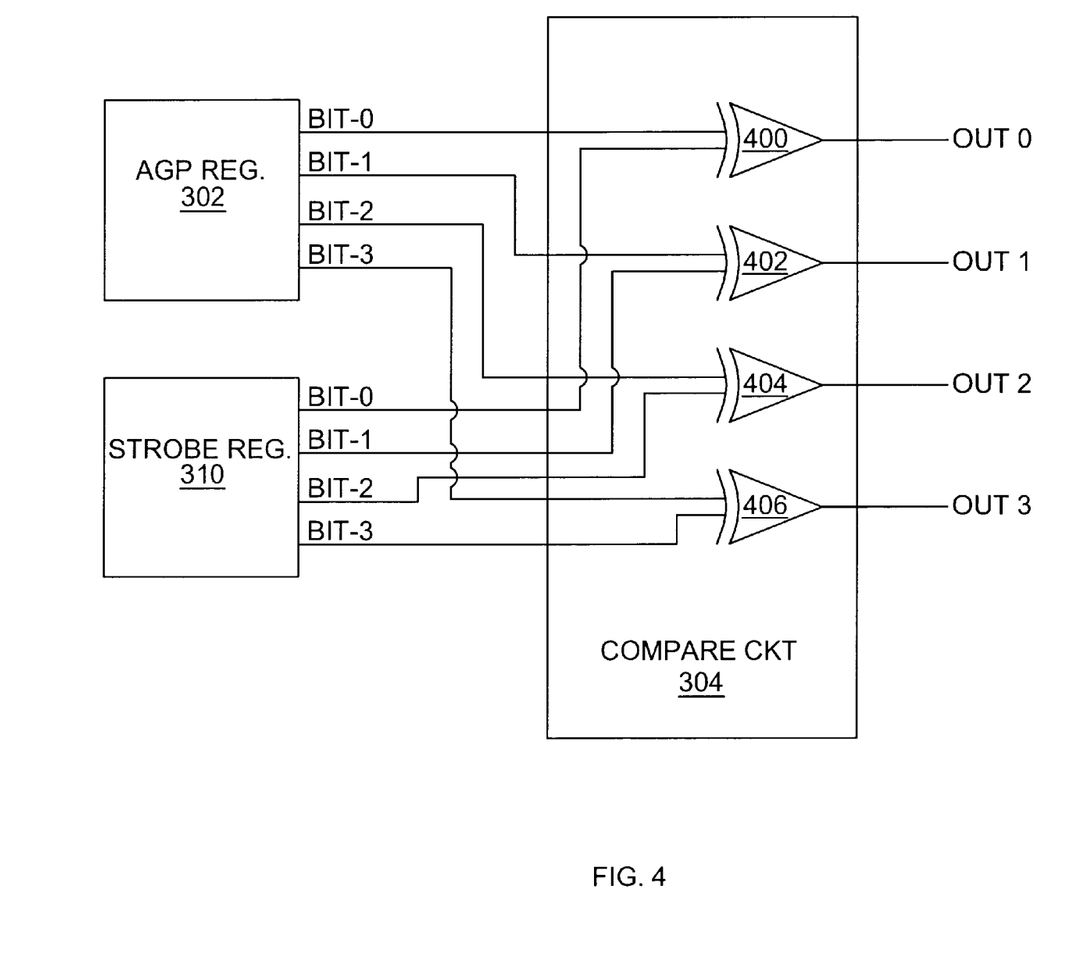
FIG. 4 shows one embodiment for the comparison circuit of the stop detector illustrated in FIG. 3.

Comparator circuit 304 compares corresponding outputs from AGP register 302 and strobe register 310. Referring to FIG. 4, illustrative XOR comparator circuit 304 includes four exclusive-or (XOR) logic gates 400, 402, 404, and 406. Each XOR gate compares complementary output signals from the AGP and strobe registers. That is, XOR gate 400 compares bit zero output from AGP register 302 with bit zero output from strobe register 310, and so on.

Selector circuit 306 selectively routes one the output signals from XOR comparator circuit 304 or stop signal 318 to latch circuit 308 under control of SYNC circuit 300 (via SEL_CTL signals 320). In the embodiment of FIG. 3, selector 306 is a 5:1 selector.

Latch 308 stores selector 306 output synchronous to AGP clock 212. Following SBA data transfer termination or a reset operation, latch output (STOP_DET) 322 is asserted to indicate a SBA data transfer operation is not in progress. In one embodiment, latch 308 may be a D-type flip-flop whose D-input is coupled to selector 306's output and which is driven/loaded by AGP clock 212.

Strobe register enable (STRB_EN) circuit 312 conditionally enables strobe register 310 to ensure that it is clocked at the same rate (although not synchronously) with AGP register 302. If AGP interface 300 is operating in the 2× mode, STRB_EN circuit 312 continuously enables strobe register 310 via signal 324. If AGP interface is in the 4× mode, STRB_EN circuit 312 enables register 310 every other strobe clock period.

Figure 5:
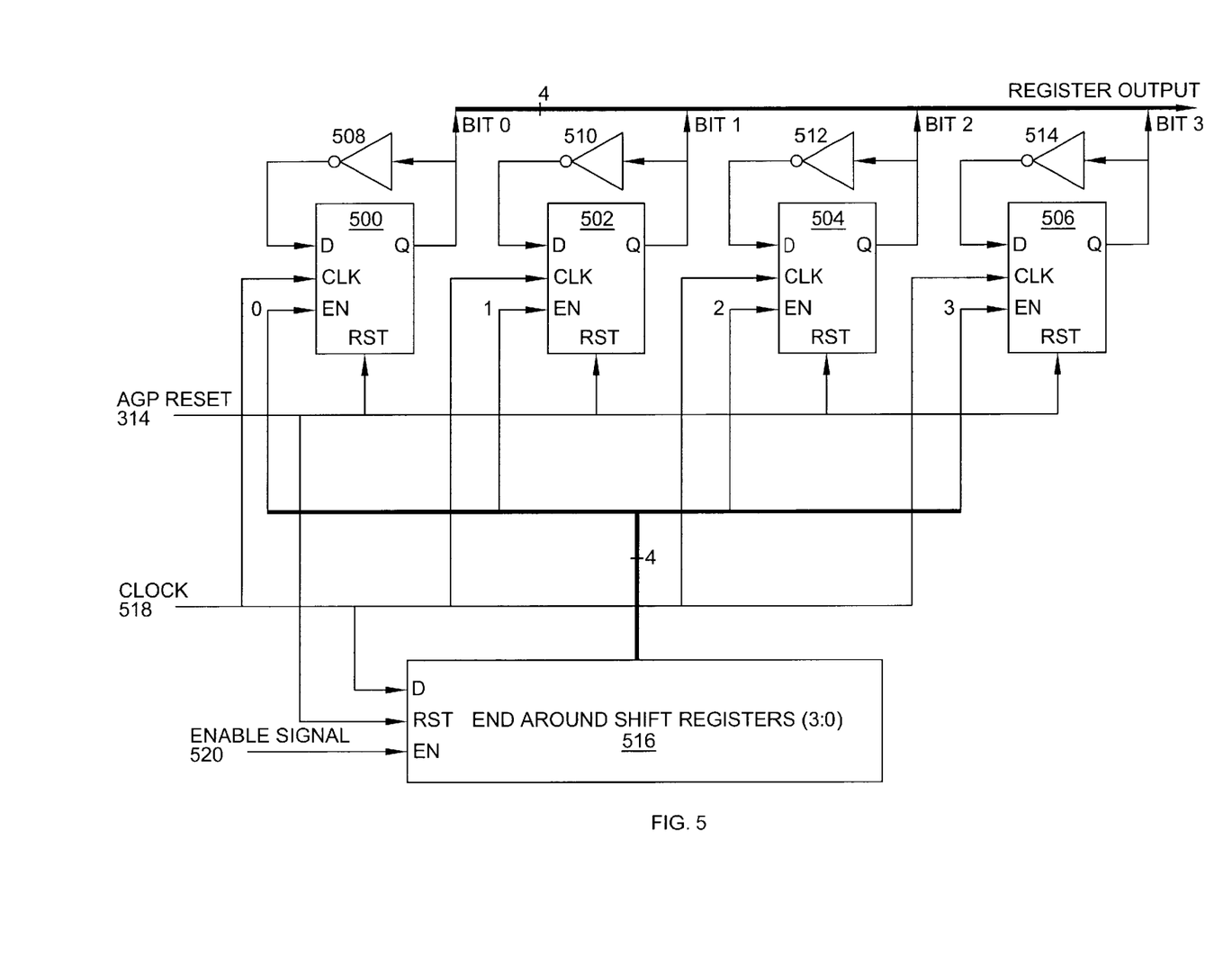
FIG. 5 shows one embodiment for the registers of the stop detector illustrated in FIG. 3.

AGP register 302 and strobe register 310 are complementary registers. That is, both registers generate the same sequence of output signals. In one embodiment, AGP register 302 and strobe register 310 are 4-bit registers implemented in accordance with FIG. 5. The output sequence for a register in accordance with FIG. 5 may be: 0000→0001→0011→0111→1111→1110→1100→1000 (repeat). The precise output sequence chosen is a matter of design choice, although some restrictions do apply (see discussion below). As shown, each register may include 4 D-type flip-flops (500, 502, 504, and 506), associated inverters (508, 510, 512, and 514 respectively), and end around shift register 516. In the embodiment of FIG. 5, shift register 516 resets to a value of 0x1 and left shifts one position each clock pulse, where clock signal 518 is AGP clock signal 212 if the register is AGP register 302, and strobe clock signal 210 if the register is strobe register 310. The output sequence for shift register 516 in accordance with this embodiment is (reset) 0001→0010→0100→1000 (repeat). In addition, enable signal 520 is enable signal 316 if the register is AGP register 302, and enable signal 324 if the register is strobe register 310.

Figure 6:
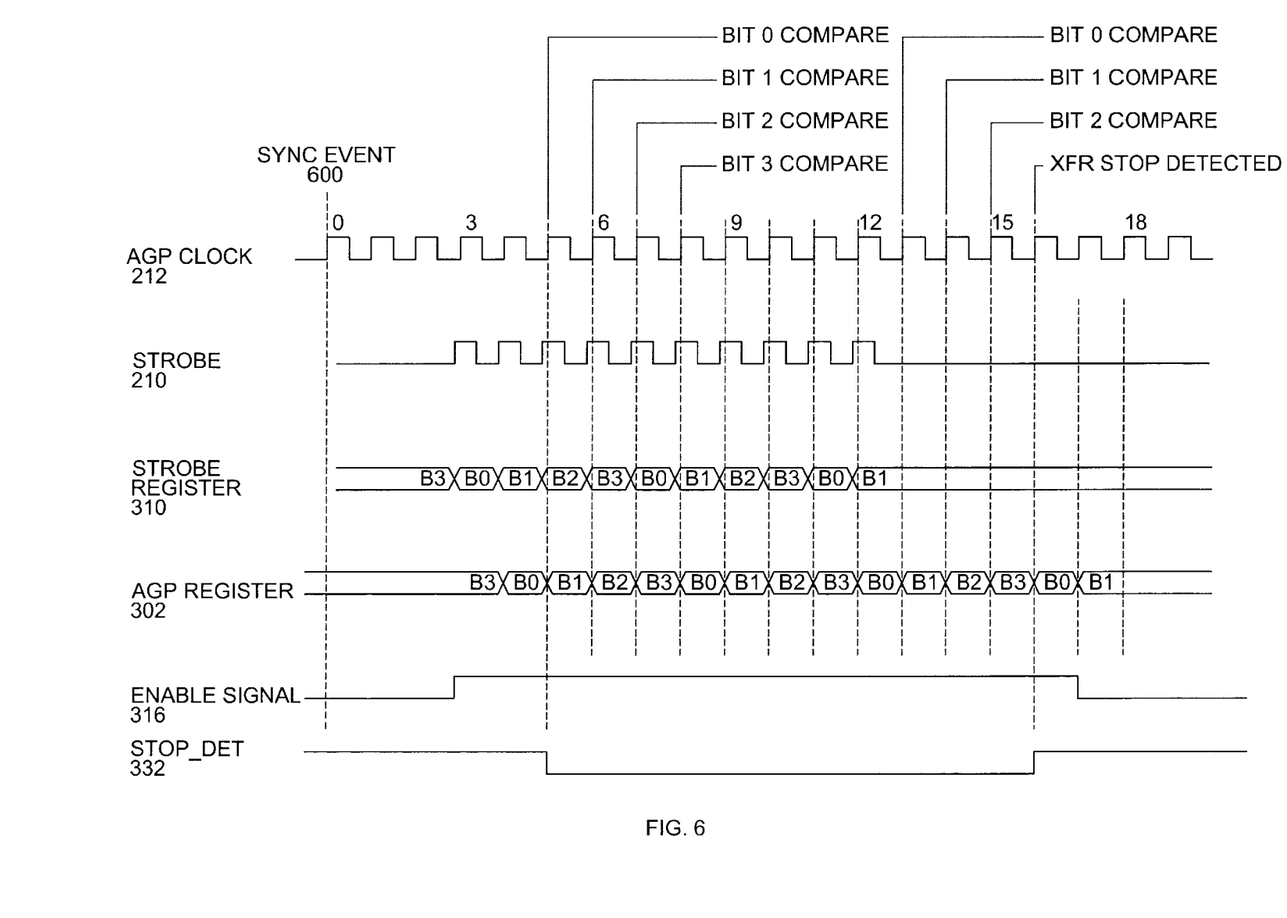
FIG. 6 shows a timing diagram for the stop detector of FIG. 3.

An illustrative timing diagram for the stop detector of FIG. 3 is shown in FIG. 6. As indicated, master initiated synchronization event 600 occurs at AGP clock 212 period 0. Approximately two AGP clock periods later, strobe clock signal 210 begins driving strobe register 310. On AGP clock period 3, SYNC circuit 300 enables AGP register 302 via AGP enable signal 316 allowing AGP clock 212 to sequence AGP register output. During AGP clock period 5, SYNC circuit 300 commands (via SEL_CTL signals 320) selector circuit 306 to route XOR comparator circuit 304's low order output bit (e.g., bit 0—the result of comparing AGP register bit 0 output with strobe register bit 0 output, see FIG. 4) to latch 308. During AGP clock period 6, the result of comparing bit 1 from AGP register 302 with bit 1 of strobe register 310 is routed through selector 306, and so forth so that each output signal from XOR comparator circuit 304 is sequentially and cyclically routed to latch circuit 308.

In accordance with FIGS. 3 and 4, as long the individual output signals from AGP and strobe registers remain the same (an XOR signal match) as they are routed through selector circuit 306 to latch circuit 308, stop detector 202 output signal (STOP_DET 322) remains deasserted. The time between any given output signal changing as AGP or strobe registers cycle through their output sequence (e.g., 4 AGP clock periods) provides sufficient setup and hold time at the input of latch 308 to reliably determine that master 204 has terminated a SBA bus data transfer operation.

Once master device 204 stops generating strobe clock signal 210 (indicating the end of a SBA data transmission), for example at approximately AGP clock period 12, strobe register 310 ceases to be clocked. Once strobe register 310 stops, it's output becomes mismatched with that of AGP register 302. This mismatch is evidenced when bit-2 output from each register is compared at AGP clock signal 15 (e.g., output from exclusive-or gate 404 will indicate bit-2 from AGP register 302 does not match bit 2 output from strobe register 310). Thus, when routed and loaded into latch circuit 308 at AGP clock 16, stop detection signal STOP_DET 322 is asserted.

Once STOP_DET signal 322 is asserted, SYNC circuit 300 continues to enable AGP register 302 for an additional two AGP clock periods (e.g., during AGP clock periods 16 and 17). This is done to ensure that AGP register 302 and strobe register 310 remain "synchronized" with respect to their output sequence. That is, the next time a SBA bus data transfer operation is initiated, strobe register 310 begins cyclically sequencing through its predefined states, AGP register 302 begins cyclically sequencing through its predefined states, and both registers begin from the same state.

In general, AGP register 302 and strobe register 310 are complementary in the sense that they generate a common output signal sequence that modifies each of their output bits only every X clock periods—a gray scale sequence (X equals 4 in the embodiment described above). Generally, each output bit should not be changed for a period of time at least equal to the maximum skew between AGP clock 212 and strobe 210 plus the required setup and hold time of latch 308; this represents a restriction on the possible gray scale sequence that AGP register 302 and strobe register 310 may generate. Further, AGP register 302 trails strobe register 310 by approximately Y AGP clock periods (Y equals 2 in the embodiment described above). As any given output bit of AGP register 302 is toggled (modified), it is compared to its corresponding output bit in strobe register 310 (which was toggled Y AGP clock periods before). If SBA interface 200 has stopped, the bit in strobe register 310 would not have toggled and would thus generate a mismatch at XOR circuit 304. This mismatch is routed through selector 306 to latch 308 where is causes STOP_DET signal 322 to be asserted. The time interval Y represents the amount of time XOR output has to setup on latch 308 input. The time interval (X—Y) represents the amount of XOR signal output hold time provided latch 308.

Figure 7:
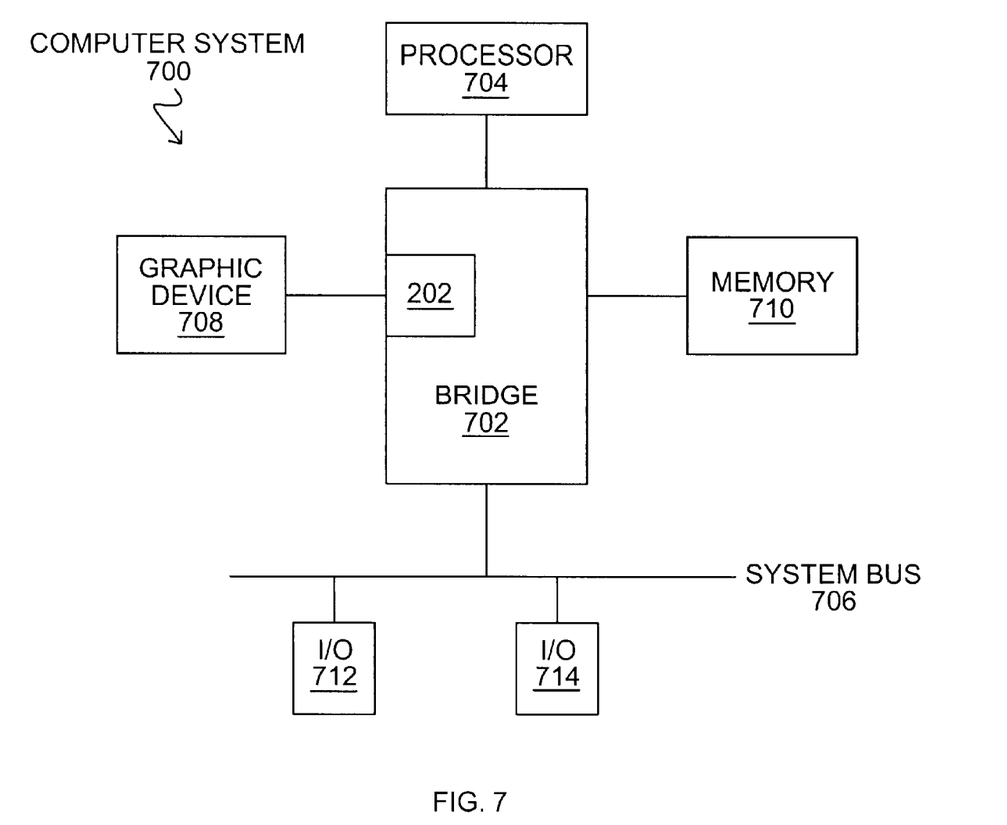
FIG. 7 shows a computer system incorporating a stop detector in accordance with one embodiment of the invention.

Referring to FIG. 7, an illustrative computer system 700 incorporating stop detector 202 within bridge circuit 702 is shown. Computer system 700 includes processor 704 coupled to system bus 706 through bridge circuit 702. Illustrative host processors 704 include the PENTIUM® family of processors from Intel Corporation. Illustrative system buses include those designed in conformance with the Peripheral Component Interconnect (PCI) specification. Bridge circuit 702 also provides an AGP interface to graphics device 708 and a memory interface to system random access memory 710. System bus 706 may provide a mechanism to couple additional devices to computer system 700. For example, I/O circuit 712 may represent a bridge circuit to another bus and I/O circuit 714 may represent a plug-in card device.

Various changes in the materials, components, and circuit elements of the illustrative examples described herein are possible without departing from the scope of the claims. For instance, a stop detector in accordance with the invention is not limited to a 1× clock frequency of 66 MHz. The stop detector of FIGS. 2 and 3 naturally scales for higher (and lower) baseline frequencies and for 2× and 4× multiples of this frequency. Furthermore, a stop detector in accordance with the invention is not limited to operating 2× and 4× multiples of a baseline (e.g., 33 MHz) frequency. For example, the invention is equally applicable to embodiments where transfer rates of 3× and 6× are possible. It will be recognized that the size and timing relationships described herein (e.g., FIG. 6) may different in these cases. However, the technique of comparing corresponding outputs from two complementary counters (each operating in a different clock domain) to determine a "loss of signal" condition is applicable to these situations.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed:

1. A method of detecting termination of a bus transfer operation between a bus master device and a bus target device, comprising:

providing a first counter clocked by a first clock signal;

providing a second counter clocked by a second clock signal;

comparing outputs of the first and second counters; and determining if termination of the bus transfer operation has occurred based on comparing the outputs, wherein providing the first counter, providing the second counter, comparing the outputs, and determining if termination has occurred is performed in the bus target device.

2. The method of claim 1, wherein providing the second counter clocked by the second clock signal comprises providing the second counter clocked by the second clock that is asynchronous to the first clock signal.

3. A method of detecting termination of a bus transfer operation, comprising:

providing a first counter clocked by a first clock signal;

providing a second counter clocked by a second clock signal;

comparing outputs of the first and second counters;

determining if termination of the bus transfer operation has occurred based on comparing the outputs; and indicating that no bus transfer operation is occurring in response to determining termination of the bus transfer operation has occurred.

4. A method of detecting termination of a bus transfer operation, comprising:

providing a first counter clocked by a first clock signal;

providing a second counter clocked by a second clock signal;

comparing outputs of the first and second counters;

determining if termination of the bus transfer operation has occurred based on comparing the outputs; and cyclically generating a predetermined sequence by the first counter, and cyclically generating the predetermined sequence by the second counter.

5. A method of detecting termination of a bus transfer operation, comprising:

providing a first counter clocked by a first clock signal;

providing a second counter clocked by a second clock signal;

comparing outputs of the first and second counters; and determining if termination of the bus transfer operation has occurred based on comparing the outputs, wherein determining if the termination of bus transfer has occurred is based on whether a mismatch is detected between the outputs of the first and second counters.

6. A method of detecting termination of a bus transfer operation, comprising:

providing a first counter clocked by a first clock signal;

providing a second counter clocked by a second clock signal;

comparing outputs of the first and second counters;

determining if termination of the bus transfer operation has occurred based on comparing the outputs; and enabling the first counter in response to reception of the synchronization event from a bus master device.

7. A method of detecting termination of a bus transfer operation, comprising:

providing a first counter clocked by a first clock signal;

providing a second counter clocked by a second clock signal;

comparing outputs of the first and second counters; and determining if termination of the bus transfer operation has occurred based on comparing the outputs, wherein providing the first counter clocked by the first clock signal comprises providing the first counter clocked by a bus clock signal, and wherein providing the second counter clocked by the second clock signal comprises providing the second counter clocked by a strobe signal from a bus master device.

8. A method of detecting termination of a bus transfer operation, comprising:

providing a first counter clocked by a first clock signal;

providing a second counter clocked by a second clock signal;

comparing outputs of the first and second counters;

determining if termination of the bus transfer operation has occurred based on comparing the outputs; and generating a gray-scale output sequence by each of the first and second counters.

9. A method of detecting termination of a bus transfer operation, comprising:

providing a first counter clocked by a first clock signal;

providing a second counter clocked by a second clock signal;

comparing outputs of the first and second counters; and determining if termination of the bus transfer operation has occurred based on comparing the outputs, wherein providing the first counter clocked by the first clock signal comprises providing the first counter clocked by an accelerated graphics port (AGP) clock.

10. A method of detecting when a bus master device terminates a bus data transfer operation, comprising:

using a first counter clocked by a first clock signal to cyclically generate a predetermined sequence of output signals;

using a second counter clocked by a second clock signal to cyclically generate the predetermined sequence of output signals; and detecting a mismatch between an output signal from the second counter with a corresponding output signal from the first counter.

11. The method of claim 10, wherein using the first counter clocked by the first clock signal comprises using the first counter clocked by an accelerated graphics port (AGP) clock.

12. The method of claim 11, wherein using the second counter clocked by the second clock signal comprises using the second counter clocked by a strobe signal from the bus master device.

13. The method of claim 12, wherein using the second counter clocked by the strobe signal comprises using a second counter clocked by an AGP sideband strobe signal.

14. The method of claim 10, wherein detecting the mismatch comprises detecting the mismatch using a comparator.

* * * * *